Patented Apr. 6, 1948

2,438,968

UNITED STATES PATENT OFFICE 2,438,968

PRODUCTION OF TEXTILE FILAMENTS, FIBERS, AND YARNS

Theophilus A. Feild, Jr., Edward W. Rugeley, and John L. Petrokubi, Charleston, W. Va., assignors to Carbide and Carbon Chemicals Corporation, a corporation of New York No Drawing. Application March 4, 1943,
Serial No. 478,010

5 Claims. (Cl. 57—157)

This invention relates to the production, from synthetic thermoplastic materials, of textiles such as filaments, fibers and yarns, having superior textile properties. It has especial utility for the production of yarns of extreme softness and excellent "loop-break" strength, using vinyl resins formed by the copolymerization of two or more vinyl compounds including a vinyl halide. However, the invention is equally applicable to the treatment of such thermoplastic materials as the polyvinyl acetal resins—e. g.—polyvinyl butyral; polyvinyl chloride resins and after-chlorinated polyvinyl chloride resins; polystyrene resins; cellulose esters such as cellulose acetate; cellulose ethers such as ethyl cellulose; and the polyamide resins.

Among spinnable copolymer vinyl resins, filaments and yarns of which are benefitted by the process of this invention, may be mentioned those produced by the copolymerization of a vinyl halide and a vinyl ester of an aliphatic acid, which resins have from about 80% to about 95% by weight of the halide in the polymer, and have an average macromolecular weight of at least 15,000. The production of textiles from such resins is described in United States Patent No. 2,161,766, issued to E. W. Rugeley, T. A. Feild, Jr., and J. F. Conlon.

Especially advantageous results, however, are secured by the application of the invention to filaments, fibers and yarns formed from certain vinyl resins produced by the conjoint polymerization of a vinyl halide with acrylonitrile (vinyl cyanide), and containing between about 45% and about 80% of the halide in the polymer, and having a specific viscosity at 20° C. of at least 0.2. The specific viscosities of the resins referred to herein are determined at 20° C., using an Ostwald viscosimeter, in accordance with the formula:

$$\text{Sp. vis.} = \frac{\text{Viscosity of a solution of 0.1 gram of the resin in 50 cc. acetonyl acetone}}{\text{Viscosity of the acetonyl acetone}} - 1$$

The specific viscosity of the resin is a direct function of its average molecular weight.

Fibers, filaments and yarns made of vinyl resins of the last-mentioned type have properties adapting them for excellent service in the production of a wide variety of textiles. Such fibers and filaments have high true elasticity, excellent flexibility and high wet and dry tenacities. They are also resistant to water, various chemical agents such as alkalies and dilute acids, and to bacterial and fungal growths. They will not support combustion. They have the outstanding property of being stabilized in a simple manner to eliminate or inhibit shrinkage thereof during subsequent processing of the fibers and yarns even at temperatures around 100° C. and above, and during normal use of the fabrics made therefrom under suitable temperature conditions not greatly in excess of that used in the stabilization.

The following description will be directed with particular reference to the improvement of filaments, fibers and yarns made from this novel type of vinyl resin, although it will be understood that the invention is not limited thereto, but is broadly applicable to filamentary materials made from a wide variety of resinous compositions including the various cellulose derivatives; the polyamide resins; and vinyl resins, including those formed by the polymerization of vinyl chloride; and those formed by the conjoint polymerization of a vinyl halide with a vinyl ester of an aliphatic acid, or with an acrylic compound such as acrylic acid and its esters, or with acrylonitrile. Such resins may have present therein substantial amounts of the usual heat-stabilizing compounds, such, for example, as certain metal compounds of carboxylic acids described in the United States Patents Nos. 2,307,090 and 2,307,092 of V. Yngve, and Patent No. 2,307,157 of W. M. Quattlebaum and C. A. Noffsinger.

The excellent physical and chemical properties of these resins render the filaments and fibers made therefrom of outstanding value in the production of textile fabrics having a wide variety of industrial applications such as in the production of filter fabrics, bolting cloth, pipe coverings, electrical insulation, protective clothing, parachute canopy shrouds and cords, hosiery, pile fabrics such as velvet and the like, braided sutures, lines, fishing nets, marine twines, sewing thread, etc.

Filaments or yarns to be treated in accordance with this invention may be prepared by forming a dispersion of a vinyl resin in an organic solvent therefor, such as acetone, extruding the resultant dispersion through tiny passages in a spinnerette of well-known type, and passing the continuous filament thus formed into an evaporative atmosphere as in the usual dry-spinning operation, or into a precipitating bath of water or the equivalent as in the usual wet-spinning operations. Filaments, straws and the like made by the melt extrusion of these vinyl resins may conveniently be treated in accordance with the invention.

The following is directed particularly to the application of the invention for improving the properties of filaments and yarns made from vinyl resins of the aforesaid vinyl halide-acrylonitrile type. It will be understood, however, that it is equally applicable to the processing of filaments of other synthetic resins which, at some stage in their life, are subjected to stretching stresses at temperatures sufficiently high to cause incipient softening of the resin at the surfaces of the filaments and some degree of adhesion of adjacent filaments of a yarn or thread.

The vinyl resins of the vinyl halide-acrylonitrile type may be made by conjointly polymerizing an aqueous emulsion of a vinyl halide and acrylonitrile, preferably in the presence of an emulsifying agent such as a water-soluble soap; and of a wetting agent, such as the 2-ethylhexyl-ester of sodium sulphosuccinate. The polymerization may be conducted at or around room temperature, but preferably is effected at elevated temperatures below 60° C. and desirably around 40 to 50° C. The polymerization is accelerated by the use of polymerization catalysts such as the alkali metal persulfates; hydrogen peroxide; and organic peroxides such as benzoyl peroxide. A constant ratio of vinyl halide to acrylonitrile preferably is maintained in the reaction mixture at all times during the polymerization by appropriate additions of the reactants. Yarns made from vinyl resins thus produced which have between about 45% and about 80% of the halide in the polymer, and which possess specific viscosities at 20° C. of between 0.1 and 0.6 are especially benefitted by the process of the invention.

In the production of textiles, a thread or yarn of the desired size is formed from extruded filaments of the resin by twisting or doubling the filaments in well-known manner, after which the yarn is stretched between about 100% and 1200% while at an elevated temperature between about 90° and 200° C. for imparting thereto an increased tenacity and the property of true elasticity. The stretched yarn then may be stabilized by treatment with steam or other hot fluid inert to the resin, in order to control the shrinkage of the yarn upon exposure to elevated temperatures around 100° C. and thereabove, during subsequent processing steps, to increase the elongation and flexibility of the yarn, and to improve its knitting and weaving properties in general. These novel textile products and the process for their manufacture are described and claimed in the United States Patent No. 2,420,565, issued May 13, 1947 of E. W. Rugeley, T. A. Feild, Jr. and J. L. Petrokubi.

Stretched yarns and threads made from filaments of such vinyl resins frequently possess an objectionable harshness or boardiness, evidently due to a certain degree of adhesion between adjacent filaments or fibers in the yarn. Thus, although the individual filaments of the yarn are well separated prior to the stretching operation, surprisingly, at the temperatures and pressure of steam to which the yarn is exposed during the stretching operation, there occurs a partial adhesion of the individual filaments. This has proved to have an adverse effect upon the "hand" of the finished yarn and upon certain physical characteristics of the yarn, notably the "loop-break" strength or loop tenacity of the yarn. Since harshness in the finished yarn cannot subsequently be eliminated in any simple manner, yarns made from these resins by prior processes are not entirely suitable for many uses for which they otherwise may be well adapted.

The loop-tenacity or "loop-break" strength of the filaments, threads and yarns may be determined by various procedures. The usual procedure in determining the tensile strength or tenacity of a single strand of a yarn is to fix the ends of the yarn in the jaws of a suitable tensile testing device. The yarn is broken by separating the jaws, thus applying a stress to the yarn in a direction parallel to its length. The load required to break the yarn, and the elongation of the yarn at the time of "break," are indicated on a suitable scale or recording device.

The "loop-tenacity" of the yarn is obtained on the same apparatus used for the tensile strength test. In this test two yarns are used. Both ends of one yarn are fixed in one jaw of the testing apparatus. Through the loop thus created the second yarn is drawn, and both of its ends are fixed in the second jaw. The yarns are broken in the manner described above by separating the jaws under the action of a selected force. The rupture of the yarns in this test occurs at the point where the two yarns form a double loop, evidently under the action of shearing forces applied to the yarns in a direction transversely of the lengths of the latter. The measurement of the force required to break the yarns in this test evaluates the yarn for many uses where tensile strength tests are inadequate or are misleading.

It has been definitely established that the maintenance of filament individuality in a thread or yarn is an important factor in securing in such yarn a high "loop-break" strength while at the same time retaining the other desirable characteristics of the yarn. The production of threads and yarns of maximum "loop-break" strength is of great commercial importance, particularly where the yarns or fabrics made therefrom, are normally subject during manufacture or use, to shearing forces applied transversely of the filamentary material as, for example, in the use of knitted fabrics such as hosiery, of braided articles, and of threads or twines which are knotted in connection with the production of certain articles such as sutures, nets, etc. The openness or softness of the yarns due to maintaining therein the individuality of the filaments and fibers, greatly improves the "hand" and covering power thereof, and has commercial significance in the production of industrial filter fabrics, and of fabrics for general use, where a good "hand" and covering power are required.

Prior attempts to improve the "hand" and softness of such yarns by treatment thereof with various lubricants, such as waxes, aqueous soap solutions and the like, by deposition of a film of the lubricant on each filament in the yarn prior to the stretching operation, have not yielded entirely satisfactory products.

The present invention is based in important part upon the discovery that, by the deposition upon the individual vinyl resin filaments, fibers or yarns, prior to the stretching of the filaments or yarns at elevated temperatures above 90° C., and preferably between about 90° C. and about 200° C., of extremely small amounts of finely-divided substantially water-insoluble solid materials inert to the resin, the individuality of the filaments may be fully preserved throughout the high temperature stretching operation, as well as subsequently thereto during further processing of the yarn, and the loop strength greatly improved. When using stretching temperatures within the range between about 100° C. and about 160° C., while the filaments or yarns are exposed to moist heat such as steam, the presence on the resin filaments of the finely divided solid material is particularly advantageous. The deposit of solid material may be and usually is superficial in nature. Such solid materials may be either organic or inorganic in nature, but preferably are not soluble in or compatible with the resin, nor with any solvent, plasticizer, heat- or light-stabilizer and the like, which may be present in the resin filaments.

The solid materials preferably selected for deposition upon the filaments and yarns are non-toxic, and have little or no abrasive action on the filament or yarn upon which they are deposited, or upon the textile manufacturing equipment handling such filaments or yarn. The solid materials are in general readily removable from the finished yarn or fabric by a suitable scouring or washing treatment.

The finely-divided solid material may be deposited upon the filaments or yarn prior to the elevated temperature stretching operation, either by the treatment thereof with a suspension of the solid material in an aqueous or other vehicle, or by precipitation of the solid material in situ on the filaments. The yarn may be treated in the form of skeins in a bath containing the suspended solids, or in successive baths containing compounds capable of interacting to form the latter; or the yarn may be passed continuously through such a bath, or through successive baths of the reactants forming the solids.

Advantageously, the collected filaments or yarns are continuously passed into and briefly immersed in a shallow body of an aqueous suspension of the finely-divided solid material as the yarn leaves the spinning cell. At this stage the yarn commonly contains some residual solvent. The yarn may be stretched somewhat before it enters the aqueous suspension of solid material, but such cold stretching does not cause adhesion of the filaments nor interfere with the effectiveness of the treatment with solid material for improving both the softness of the yarns and their "loop-break" strengths following the stretching of the yarns at elevated temperatures around 100° C. and above.

In the treatment of yarn in conjunction with the spinning of filaments of the aforesaid resins, it is advantageous to conduct such filaments while under normal spinning tensions, and without twist, onto a take-up bobbin having a portion immersed in a suspension of the finely-divided solid material, or a solution of the reactants producing the latter.

In the treatment of filaments and yarns that have been previously collected on take-up bobbins in prior spinning operations, the filament, thread or yarn being provided with a surface coating of finely-divided solid materials has been given a low twist, and is under very low tension, in order to facilitate the penetration between the individual filaments of the yarn by the solids, or by the reactants producing the same. The treated yarn should receive a minimum of handling following the solids deposition thereon and prior to the stretching of the yarn.

While the amount of the finely-divided solid material used in the treatment may be varied between rather wide limits—and aqueous suspensions containing 10% and more of the solids have been used—it is preferred to use extremely dilute suspensions containing amounts of solids of the order of 0.5% to 2.5% of the latter. The use of these very dilute suspensions of the solid materials insures excellent filament separation and freedom from bonding during the subsequent high temperature stretching of the yarn. The effectiveness of this small amount of solids for the desired purpose is extremely surprising, particularly when treating vinyl resins which are highly water-resistant and are not substantially penetrated by the treatment liquid or suspension. The coated filaments and yarns preferably are dried at a temperature below the softening point of the resin prior to the high temperature stretching operation. A drying temperature of 60° C. is very satisfactory.

At some stage subsequent to the stretching of the treated filaments and yarns, the latter may be scoured or treated to eliminate the solid materials; or the fabrics made from the treated yarn may be scoured to effect this result.

The following examples serve to illustrate the invention.

Example I

A vinyl resin having a vinyl chloride content of 62.9%, and a specific viscosity at 20° C. of 0.315, was produced by the conjoint polymerization of vinyl chloride and acrylonitrile, present in the ratio by weight of 9:1 in an aqueous suspension containing approximately 1% of potassium persulfate and 1% of sodium di(2-ethylhexyl) sulphosuccinate, based on the weight of the reactants. The polymerization was conducted in an autoclave at a temperature of 40° C.; and the acrylonitrile was added in successive portions as required to maintain the aforementioned vinyl chloride-acrylonitrile ratio by weight.

A dispersion in acetone of the resultant resin containing 15% by weight of the resin and 0.25% by weight based on the resin of dibutyl tin dilaurate as a heat-stabilizer for the resin, was mixed for 4 hours at 45° C., was filtered and wet-spun through a spinnerette having 30 orifices each 0.006 inch in diameter. The filaments were precipitated in and passed through a precipitating bath of water containing approximately 3% of acetone, maintained at 23°–25° C. The filaments were gathered into a thread or yarn which was then wound on a godet so driven as to remove the yarn from the bath at the rate of 60 feet per minute. The yarn then was led to a take-up bobbin driven to provide a speed of 150 linear feet per minute. Thus, the yarn was stretched 150% between the godet and take-up bobbin. The take-up bobbin had its lower surface submerged in a 1% suspension in water of a colloidal clay being marketed under the designation bentonite. The small amount of bentonite deposited upon the individual filaments was replaced by controlled additions of this material to the aqueous suspension. The treated yarn cakes on the take-up bobbin were then dried in an oven for two hours at 60° C. The chalky-appearing yarn cakes then were submerged in a water bath at 65° C. for six hours to remove completely any residual acetone still present in the yarn. Two ends of the yarn, from two spools, were then plied with three turns twist, and the resultant yarn stretched 800% in an atmosphere of steam at a temperature of 125° C. For purposes of comparison, a quantity of the yarn which had not been treated with the bentonite was stretched 800% at 128° C.

The respective stretched yarns had the characteristics indicated in Table 1:

Table 1

|  | Unstabilized Yarn | |
| --- | --- | --- |
|  | Without Bentonite | With Bentonite |
| Denier | 43 | 42 |
| Filaments, number of | 60 | 60 |
| Wet tenacity grams per denier | 5.10 | 5.32 |
| Wet elongation per cent | 8.8 | 8.6 |
| Shrinkage in water at 100° C do | 19 | 20 |

The respective yarns were thermally stabilized by skeining the stretched yarns, and then shrinking the untensioned yarn by immersion in a boiling water bath for one hour. The skeins were rewound upon spools after applying a mild lubricant comprising an emulsifiable mineral oil in the form of an aqueous emulsion.

The yarn after the stabilization treatment possessed the physical characteristics indicated in Table 2:

Table 2

|  | Stabilized Yarn | |
| --- | --- | --- |
|  | Without Bentonite | With Bentonite |
| Denier | 51 | 52 |
| Number of filaments | 60 | 60 |
| Wet tenacity grams per denier | 4.42 | 4.30 |
| Wet loop-break tenacity do | 2.42 | 4.00 |
| Wet elongation per cent | 26.7 | 26.0 |
| Wet loop-break elongation do | 15.0 | 24.0 |
| Shrinkage in water at 100° C do |  | 0.7 |
| Shrinkage in oil at 125° C do |  | 5.0 |

The yarn which had been treated with bentonite was characterized by extreme softness and by the non-adhesion of the individual filaments.

*Example II*

A spinning "dope" comprising a 21% by weight dispersion in acetone of a vinyl resin produced by the conjoint polymerization of vinyl chloride and vinyl acetate, said resin having a vinyl chloride content of 90% and a macromolecular weight in excess of 20,000, was dry-spun through a spinnerette having 30 orifices each 0.06 millimeter in diameter. The resultant filaments were dried by passing through a drying cell in contact with air heated to 85° C., and thence were collected and wound on a take-up bobbin at the rate of 125 meters per minute. The take-up bobbin had its lower surface submerged in a 1% aqueous suspension of bentonite. The coated yarn was oven dried at 60° C. for two hours, and was then twisted 8 turns per inch, and further dried on the twisting spools at 60° C. for 24 hours to complete the removal of solvent. The yarn was then stretched 463% while exposed to an atmosphere of steam at 123° C.

The finished yarn was exceedingly soft, and the filaments were well separated. The yarn possessed a "loop-break" strength 95% of its tensile strength as measured by the usual procedure. A yarn made under similar conditions, excepting that the treatment with bentonite was omitted, normally has a "loop-break" strength around 58% of its tenacity or tensile strength. In the case of the untreated yarns, the latter are somewhat wiry in "hand" and the filaments thereof do not readily separate.

*Example III*

An unstretched vinyl chloride-acrylonitrile yarn, made from a resin of the type mentioned in Example I, was treated in skein form with a 50% solution of tetraethyl orthosilicate in isopropanol. The treated yarn was immersed in water at 50° C., for 3 hours to hydrolyze the ethyl silicate and form a gel of silicic acid on the individual filaments, after which the yarn was stretched 800% at 128° C., in the general manner described in Example I. The finished stretched yarn was of extreme softness and possessed a much higher "loop-break" strength than a corresponding yarn stretched under similar conditions without the pretreatment with tetraethyl silicate or its equivalent.

Equally good results were secured by treating the yarn, before it was stretched at elevated temperatures, with an aqueous solution of barium chloride, followed by a treatment of the yarn with an aqueous solution of ammonium sulfate, whereby finely-divided barium sulfate was precipitated in situ on the respective filaments.

*Example IV*

A yarn having a low twist, and formed from a vinyl chloride-acrylonitrile copolymer resin of the type described in Example I, was drawn continuously under low tension through an aqueous solution containing 1% by weight of sodium carbonate and 1% by weight of a water-soluble soap, following which the wet yarn was drawn through a body of a 2.5% aqueous solution of calcium chloride. A mixture of calcium carbonate and a calcium soap thus was formed and deposited in situ on the filaments of the yarn. The yarn was then passed directly to the feed roll of a stretching apparatus, and was stretched 800% while heated in the presence of steam at a temperature of 128° C., after which the stretched yarn was wound upon a take-up bobbin in the usual manner. The finished yarn was of extreme softness. The slight deposit of finely-divided solid materials on the yarn conveniently is removed from the finished goods made from such yarn by washing or scouring such goods with a dilute acid such as acetic acid, although ordinary scouring is usually sufficient. If desired, the yarn leaving the calcium chloride solution may be wound on a redraw spool for subsequent feed to a yarn-stretching unit.

It will be understood that the above-mentioned bath concentrations are not critical; and that other reactants may be substituted for those mentioned to secure deposition upon the filaments of other desired solids. The presence of the soap is very desirable but not essential. However, it provides a better film of solids on the filaments by coprecipitation of calcium carbonate and a calcium soap film or curd.

*Example V*

A skein of low-twist unstretched yarn made from a vinyl resin produced by the copolymerization of vinyl chloride and acrylonitrile, said resin containing about 60% of the chloride in the polymer, and having a specific viscosity at 20° C. of about 0.3, was agitated for ten minutes in a 1% aqueous solution of aluminum chloride. The yarn was then immersed for ten minutes in a 1% aqueous solution of ammonia. The treated yarn was then rewound damp after which the yarn was stretched 800% in standard yarn-stretching equipment in the presence of steam at 128° C. The deposited aluminum hydroxide, which is present on the surfaces of the filaments of the yarn in very small amount, is readily removed during subsequent scouring of the fabric made from the yarn. Stretched yarns thus produced are all extremely soft, and have excellent "loop-break" strengths.

There may be substituted for the vinyl resin set forth in Example V a resin of the type recited in Example II, with similarly excellent results.

The yarns which have been stretched, following the treatment of the unstretched yarns by the process of the invention, possess all of the important properties of the stretched yarns normally produced from such vinyl resins and, in addition, possess a remarkable softness and high "loop-break" strength normally lacking from yarns not thus treated. The invention is of particular value in connection with the production of staple fibers from these stretched vinyl resin yarns, because of the filaments forming the yarn being well separated and not adherent to each other.

It will be understood that numerous other compounds besides those specifically named, may be employed in the pretreatment of the filaments and yarns prior to the high temperature stretching operation. Thus, sulfates of barium, calcium, and lead; carbonates of barium, calcium, magnesium, lead and zinc; oxides and hydrated oxides of aluminum, titanium, zinc, tin and silicon; and water-insoluble phosphates, silicates, and borates such as barium phosphate, and barium and calcium borates, are suitable for use; as well as solutions of compounds capable of reacting in the presence of the filaments and yarn to form such compounds. Likewise alkyl and aryl silicates and borates, which readily hydrolyze in the presence of water, may effectively be used.

The invention is susceptible of modification within the scope of the appended claims.

We claim:

1. Process for producing from filaments of a vinyl resin formed by polymerizing a mixture of vinyl compounds including a vinyl halide, stretched yarns of excellent softness and high "loop-break" strength, which comprises surface coating each of at least two associated freshly spun continuous filaments of such a vinyl resin with finely-divided particles of a solid substantially water-insoluble inorganic compound which is not compatible with said vinyl resin, while said filaments contain residual volatile spinning solvent, forming the thus coated filaments into yarn, drying the yarn at a temperature below the softening point of the resin and removing residual solvent from the filaments, and subsequently stretching such coated filaments at least 100% while subjecting such filaments to steam at a temperature within the range between about 100° C. and about 160° C.

2. Process for producing from filaments spun from a dispersion in a volatile spinning solvent of a vinyl resin formed by polymerizing two vinyl compounds including a vinyl halide, stretched filaments and yarns of excellent softness and high "loop-break" strength which comprises continuously conducting successive portions of a plurality of freshly spun continuous filaments of such a vinyl resin into an aqueous suspension of a finely-divided water-insoluble inorganic solid material that is inert towards said resin and melts above the stretching temperature to be used, while the filaments are under low spinning tension and contain residual spinning solvent, concurrently collecting the said filaments and winding them on a take-up bobbin having a portion of the filament-contacting surface thereof immersed in said aqueous suspension, thereby forming upon all surface portions of each of said filaments a surface deposit of such solid material, subsequently twisting the coated filaments to form a yarn, and stretching such yarns at least 100% while subjected to moist heat at a temperature within the range between about 100° C. and about 160° C.

3. In a process for producing from a water-resistant vinyl copolymer resin formed by polymerizing a mixture of vinyl compounds including a vinyl halide, stretched filaments and yarns of excellent softness and high "loop-break" strength, wherein a spinnable solution of such a resin in a volatile spinning solvent is extruded to form a plurality of filaments, the filaments while containing residual spinning solvent are collected and twisted to form a yarn, and the resultant yarn is stretched at least 100% while exposed to moist heat at a temperature within the range between about 100° C. and about 160° C., the steps which comprise collecting the freshly spun filaments to form a yarn without substantial twist while under spinning tension and while the individual filaments contain residual volatile spinning solvent and concurrently immersing the spun filaments within an aqueous suspension of a finely-divided water-insoluble inorganic solid which melts above the said stretching temperature and is incompatible with the components of said resin, thereby coating the individual filaments with such inorganic solid, gathering the coated filaments to form a yarn, heating such yarn at an elevated temperature below the softening point of the resin to remove residual spinning solvent, twisting the thus-coated yarn, and stretching the twisted yarn as aforesaid.

4. In a process for producing stretched filaments and yarns of excellent softness and high "loop-break" strength, wherein filaments of a vinyl resin formed by the copolymerization of vinyl chloride and acrylonitrile and containing between about 45% and about 80% of the chloride in the polymer and having a specific viscosity at 20° C. of between 0.2 and 0.6 are twisted into yarn and the yarn is stretched at least 100% while exposed to a temperature between 100° C. and 200° C. in the presence of moist heat, the improvement which comprises the steps of applying to each of said freshly spun filaments prior to the formation and stretching of the yarn and while the filaments contain a substantial amount of a volatile spinning solvent, an aqueous suspension of a finely-divided water-insoluble inorganic solid which is not compatible with the components of such resin and which has a melting point above said stretching temperature, gathering the thus coated filaments to form a yarn, heating the latter at a temperature below the softening point of the resin to remove residual spinning solvent present therein, twisting the yarn, and thereafter stretching the coated yarn as aforesaid.

5. In a process for producing stretched filaments and yarns of excellent softness and high "loop-break" strength, wherein freshly spun filaments of a vinyl resin produced by the polymerization of vinyl chloride and acrylonitrile and containing between about 45% and about 80% of the chloride in the polymer and having a specific viscosity at 20° C. of between 0.2 and 0.6 are twisted into yarn, and the yarn is stretched at least 100% while exposed to a temperature between 100° C. and 200° C. in the presence of moist heat, the improvement which comprises the steps of applying a dilute aqueous suspension of bentonite to each of the freshly spun individual filaments prior to the twisting of the filaments to form a yarn, gathering the resultant bentonite-coated filaments to form a yarn, heating the latter at an elevated temperature substantially below the softening point of the resin to remove residual spinning solvent, twisting the coated yarn, and thereafter stretching the coated yarn as aforesaid.

THEOPHILUS A. FEILD, JR.
EDWARD W. RUGELEY.
JOHN L. PETROKUBI.

REFERENCES CITED

The following references are of record in the file of this patent:

UNITED STATES PATENTS

| Number | Name | Date |
|---|---|---|
| 1,883,349 | Dreyfus | Oct. 18, 1932 |
| 1,983,349 | Dreyfus | Dec. 4, 1934 |
| 2,086,544 | Dreyfus | July 13, 1937 |
| 2,113,361 | Montes | Apr. 5, 1938 |
| 2,113,935 | Dreyfus et al. | Apr. 12, 1938 |
| 2,147,312 | Partridge | Feb. 14, 1939 |
| 2,150,568 | Whitehead | Mar. 14, 1939 |
| 2,161,766 | Rugeley et al. | June 6, 1939 |
| 2,163,642 | Wallach | June 27, 1939 |
| 2,220,958 | Jennings | Nov. 12, 1940 |
| 2,262,689 | McDowell et al. | Nov. 11, 1941 |
| 2,331,715 | Nadeau et al. | Oct. 12, 1943 |
| 2,346,208 | Conaway | Apr. 11, 1944 |
| 2,395,396 | Conaway | Feb. 26, 1946 |